United States Patent [19]
Peral et al.

[11] 3,942,166
[45] Mar. 2, 1976

[54] FAULT DETECTION AND SIGNALING SYSTEM

[75] Inventors: Juan Jose Zubeldia Peral; Jose Luis Gomex Llona, both of Munguia, Spain

[73] Assignee: Arteche, Instrumentacion y Sistemas Electronicos, S.A., Munguia, Spain

[22] Filed: June 10, 1974

[21] Appl. No.: 477,687

[30] Foreign Application Priority Data
June 16, 1973 Spain .................................. 415997

[52] U.S. Cl. .............. 340/213.1; 340/326; 340/415
[51] Int. Cl.² ..................... G08B 25/00; H04Q 9/00
[58] Field of Search ........ 340/213.1, 226, 327, 408, 340/415, 326; 179/69 R

[56] References Cited
UNITED STATES PATENTS

| | | | |
|---|---|---|---|
| 3,193,814 | 7/1965 | Foster | 340/223 |
| 3,480,938 | 11/1969 | Martin | 340/213.1 |
| 3,537,089 | 10/1970 | Lee | 340/213.1 |
| 3,550,121 | 11/1970 | Porter | 340/415 |
| 3,550,122 | 12/1970 | Siddiqi | 340/213.1 |
| 3,582,925 | 6/1971 | Porter | 340/213.1 |
| 3,641,539 | 2/1972 | Lesher | 340/213.1 |
| 3,686,654 | 8/1972 | Judlowe | 340/213.1 |

*Primary Examiner*—John W. Caldwell
*Assistant Examiner*—James J. Groody
*Attorney, Agent, or Firm*—Flynn & Frishauf

[57] ABSTRACT

A fault detection and signaling system is responsive to a fault detection to generate a first type of warning signal indicative of fault detection and includes means operable to indicate that a fault is "acknowledged" and for causing the generation of a second type of warning signal if the fault still exists and to cause ceasing of generation of the first type of warning signal if the fault no longer exists. Further provided is means responsive to fault detection by another fault detection and signaling system for causing generation of a third type of warning signal when a fault is indicated by the present system subsequent to a fault detection by another system.

16 Claims, 3 Drawing Figures

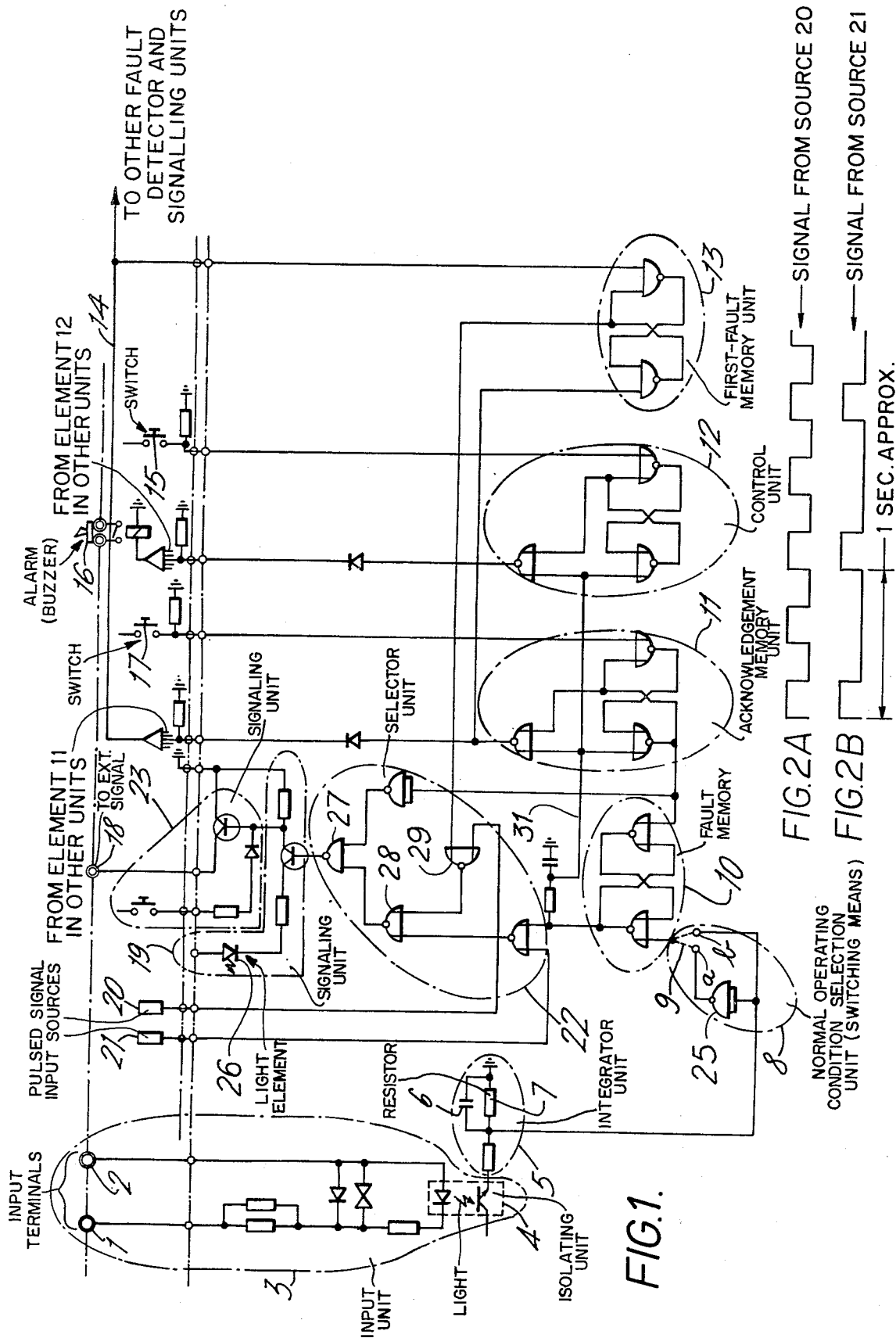

FAULT DETECTION AND SIGNALING SYSTEM

This invention relates to fault detection and signaling systems.

In automated industrial processes, highly reliable multiple-fault detection and signaling systems are required so as to insure proper operation of the automated equipment. Also, fault detection systems having a high degree of versatility rendering them useful in various types of applications are required. The present invention has been arrived at so as to provide an improved fault signaling system which is particularly suitable for use in applications where multiple fault detectors are used so as to provide high system reliability especially in automated applications.

An object of the present invention is to provide a system which is capable of detecting a fault by using either the making or breaking of a contact actuated by fault-occurrence, as well as by means of an electrical signal generated as a result of fault-occurrence. This provides a high degree of versatility of use.

A second object of the present invention is to provide a system which is isolated from the system being checked, thereby eliminating mutual electrical interaction between the fault detection and signaling system and the operating system being monitored.

A still further object of the present invention is to provide a multiple detection and signaling system having different types of signaling for a first fault occurrence relative to subsequently occurring faults.

SUMMARY OF THE INVENTION

In accordance with the present invention, a multiple fault detecting and signaling system comprises detection means, coupled to a system to be monitored for generating a detection signal corresponding to a fault in the monitored system; signaling means responsive to the detection signal for generating a first type of warning signal indicating presence of a fault; and memory means responsive to generation of the detection signal for storing an indication of fault detection. Further provided is means coupled to the memory means and operable for indicating that a fault is acknowledged and for causing the signaling means to (i) generate a second type of warning signal if the fault still exists and (ii) to cease generation of a warning signal if the fault no longer exists; and a "first-fault" memory means for indicating detection of a fault by another fault detection and signaling system and for causing the signaling means to generate a third type of warning signal when a fault is indicated by the detection means subsequent to fault detection by said another system.

Preferably, the detection means includes electrical isolation means (which may be opto-electrical device) to prevent electrical interaction between the detection and signaling system and the system being monitored. Further, additional signaling devices may be provided for remote and/or local signaling of an operator of the system.

Still further, the detection means preferably include switching and logic to enable the system to be responsive to the making or breaking of a contact actuated by fault-occurrence, or the presence or absence of an electrical signal to indicate a fault occurrence. Still further, a (integrator) circuit is preferably provided to eliminate effects of transient signal pulses.

BRIEF DESCRIPTION OF THE DRAWING

FIG. 1 is a circuit diagram of an embodiment of the present invention; and

FIGS. 2A and 2B are illustrations of waveforms appearing in the circuit of FIG. 1.

DETAILED DESCRIPTION OF ILLUSTRATED EMBODIMENT

In detecting faults possibly appearing in machinery, instruments, or other industrial installations, a multiplicity of signaling circuits are used, each being as shown in FIG. 1. Each signaling means is provided to detect a pre-specified fault and transmit its presence to an alarm means or the like.

The input unit 3 for each system is connected to an external busbar 1, common or otherwise according to the circumstances, and to a fault-appearance data input terminal 2. The input unit 3 includes an opto-electronic insulating (or isolating) unit 4, making use, for example, either of an electrical input signal at terminal 2, or else the breaking or making of a contact coupled to terminal 2 as an indication of a fault appearance. The opto-insulator unit 4 itself additionally establishes a galvanic separation, thereby electrically isolating the input unit 3 from the remainder of the fault detection system.

Unit 4 includes a light emitting diode, or other light source, and a light responsive transistor, or the like.

The input unit 3 is coupled to an integrator unit 5 which includes a resistor 7 and capacitor 6 in parallel therewith, one end of the parallel connection being grounded and the other end being coupled to the output portion of isolating unit 4. Integrator unit 5 is to eliminate contact-chatter effects, interference, etc.

The fault detecting system further includes a normal operating-condition selection unit 8 coupled between the input units 3,4,5 and the rest of the system. In FIG. 1, unit 8 is connected to unit 3 via integrator unit 5 and isolating unit 4. By means of setting the contact 9 of unit 8 in position b, the output of input units 3,4,5 is coupled to the rest of the system such that the system operates as a consequence of "signal presence" or of a contact "making" as the result of a fault condition. By setting the contact 9 to the other position a, the connection to the rest of the system is established through an inverting logic operator 25, thereby transmitting a signal only when there is no input to the inverting circuit 25 and therefore operating the system so that a fault is indicated as a result of a "no input signal" condition or the result of contact "break", both eventualities set up by presence of a fault.

The system also includes a fault memory 10 made up of NOR logic operators detecting the appearance of the fault through the effect produced, i.e., a signal being received or otherwise, a contact either making or breaking, according to the present position of switch 9. The detection of the fault is held in memory 10 even after the fault disappears (i.e., a fugitive fault).

The output of memory 10 is coupled to a selector unit 22 made up of conventional logic operators. Selector unit 22 is connected to two pulsed signal input sources 20,21 of different frequencies. Signals from sources 20 and 21 are shown in FIGS. 2A and 2B, respectively. The selector unit 22 provides a pulsed output, the frequency of which is a function of the fault detection by unit 3 and fault detection by other units of other fault detectors of the overall system. This is explained further below.

The output of selector unit 22 is coupled to two signaling units 19,23 which form part of the system. The local signal unit 19 has a light-emitting diode 26 which produces a flicker (or intermittent flashing) when the signal provided by selector unit 22 as a result of fault detection is fed to the signaling unit 19. The other signaling unit 23 is fed through the foregoing unit 19 to provide a warning at any outside point by means, for example, of flicker occurring in an external signal lamp (not shown) which may be connected at point 18.

Fault-appearance also causes the loading or energization of an auxiliary line 14 which is connected in common to all the systems which are each as described above and which are mounted in, or otherwise form a part of, an overall control system.

An information or "acknowledgement" memory unit 11 is connected to the memory 10 and selector unit 22 and is further connected to pushbutton 17 operable by the system operator to indicate that the fault-warning signal for some defect has been acknowledged. Switch 17 may form an integral part of unit 11. Due to the cutoff effects of closing switch 17, the memory 10 is caused to operate on the selector unit 22, thereby causing a change in its output signal which by effect of this permutation now causes the continuous lighting of the light element 26 of signaling unit 19 and continues lighting of the external lamp (not shown) connected at point 18 to signaling unit 23 if the fault continues even at the time of pushing or closing of the switch 17 by the operator. The faultwarning signal is not cut off until the fault has been cleared. This permits the operator doing the appropriate fault-clearing work to check by means of the signaling units 19, 23 whether his work has cleared the fault or not. If the fault no longer continues (fugitive) at the time of depressing the switch 17, the system is reset and left in the "watch" position, and the indicator lights are extinguished.

The system also includes a first-fault memory unit 13 which is connected to a "no-go" or "prohibition" line 14. Memory 13 operates when, at the time a fault is detected, line 14 is already pre-loaded or energized, which denotes the prior operation of some other interconnected fault detecting unit of the system. Therefore, for example, when the illustrated system detects a fault subsequent to the detection of another fault by another non-illustrated fault detector of the system (which are preferably identical to that shown in the Figure and form a complete control system), the memory unit 13 will operate to cause the signals from source 21 to be fed to gate 27 via gates 28, and 30 to signaling units 19 and 23, thereby causing the signal transmitted by unit 22 of the system in question to generate a slow flicker of the light element 26.

The fault first signalled by the group of fault detecting systems is a quick flicker (or intermittent flashing) of the indicator light element 26 or an external light element connected at point 18. A subsequent fault detected by any one of the fault connecting systems (each being similar to the one shown in FIG. 1 and interconnected therewith via line 14), is signalled by a slow flicker (or intermittent flashing) if the prior fault has not disappeared or been corrected before occurence of said subsequent fault. This differentiates timing priority. The signals at sources 20 and 21 have timing priority. The signals at sources 20 and 21 have complementing (rates) so as to provide this effect. That is, the pulses are in phase and of equal width so one rate must be a multiple of the other. In a typical embodiment the signals at sources 20 and 21 as illustrated in FIGS. 2A and 2B, have respective frequencies of 2 and 1 pulses per second.

Each one of the systems also may have a klaxon (i.e., a bell, or buzzer) 16 controlled by a control unit 12 which excites it as a consequence of fault appearance. Other audible alarm devices could be used. Control unit 12 is triggered via line 31 upon detection of a fault. A pushbutton switch 15 is coupled to control unit 12 to silence the klaxon 16. Operation of switch 15 impresses a signal on the control unit 12 which not only silences the klaxon 16 in question but holds it in that silenced condition until a further fault occurs.

We claim:

1. A multiple fault detection and signaling system for monitoring an electrical apparatus, comprising:
    sensing means (3,4,5,8) coupled to said monitored electrical apparatus, said sensing means sensing a first fault in the monitored electrical apparatus and generating a detection signal corresponding to said sensing of said first fault;
    signaling means (10,22,20,21,19,23) including a fault memory means (10) and a single warning signaling element (26), said signaling means including means responsive to said detection signal for energizing said single warning signaling element to generate a first type of warning signal which indicates said sensing of said first fault;
    memory means (11) coupled to said signaling means, said memory means (11) being responsive to said generation of said detection signal for storing an indication of said sensing of said first fault;
    means (17) coupled to said memory means (11) and including: means operable for indicating that said first fault is "acknowledged"; and means for causing said signaling means to energize said single warning signaling element (26) to (i) generate a second type of warning signal, distinguishable from said first type of warning signal, if said first fault still exists and (ii) to cease generation of said first type of warning signal if said first fault no longer exists; and
    a fault memory means (13) operable to store a signal indicating a second fault sensed by another fault detection and signaling system, and operatively coupled to said signaling means;
    said signaling means including means responsive to said second fault indicating signal stored in said fault memory means (13) to energize said single warning signaling element (26) to generate a third type of warning signal, distinguishable from said first and second type warning signals, when said first fault is sensed by said sensing means (3,4,5,8) subsequent to said sensing of said second fault by said another fault detection and signaling system.

2. A system according to claim 1 wherein said fault memory means (10) stores an indication of said sensing of said first fault, whereby said signaling means continues to generate said detection signal even after said first fault ceases to exist in said monitored system.

3. A system according to claim 2 wherein said memory means (11) has its input coupled to said fault memory means (10).

4. A system according to claim 2 wherein said means operable for indicating that said first fault is acknowledged, which means forms a part of said means (17), includes means for resetting said memory means (11) and said fault memory means (10) when said first fault no longer exists.

5. A system according to claim 2 wherein said signaling means includes logic means (22) responsive to said fault memory means (10), memory means (11) and first-fault memory means (13) for causing selective generation of said first, second and third types of warning signals by said single warning signaling element.

6. A system according to claim 5 wherein said signaling means includes a first signal source generating signals of a first frequency and a second signal source generating signals of a second frequency, said first and third types of warning signals being signals of different frequency.

7. A system according to claim 6 wherein said first and third types of warning signals are intermittently flashing lights flashing at said different frequencies.

8. A system according to claim 6 wherein said signaling means includes means for generating said second type of warning signal as a constant (or zero frequency) warning signal by constantly (or always) energizing said single warning signaling element.

9. A system according to claim 8 wherein said warning signaling element is a light, and constant warning signal is a constantly energized light.

10. A system according to claim 1 wherein said sensing means includes isolation means (4) electrically isolating said fault detection and signaling system from said monitored electrical apparatus.

11. A system according to claim 10 wherein said isolation means (4) comprises an opto-electrical isolation means.

12. A system according to claim 1 wherein said sensing means includes integration means for preventing transients from causing fault signaling.

13. A system according to claim 1 wherein said sensing means includes switching means (8) for selectively rendering said sensing means responsive to the operating condition of a switch whereby said sensing means generates said detection signal as a function of the operating condition of said switch.

14. A system according to claim 1 wherein said sensing means includes switching means (8) for selectively rendering said sensing means responsive to an electrical signal condition whereby said sensing means generates said detection signal responsive to said electrical signal condition.

15. A system according to claim 1 wherein means (17) is coupled to said signaling means for checking operation of said signaling.

16. A system according to claim 1 wherein said fault memory means (10), memory means (11) and first-fault memory means (13) are each responsive to input signals having first and second logic levels and provide digital output signals of first and second logic levels.

* * * * *

UNITED STATES PATENT AND TRADEMARK OFFICE
CERTIFICATE OF CORRECTION

PATENT NO. : 3,942,166
DATED : March 2, 1976
INVENTOR(S) : Juan J.Z. PERAL et al It is certified that error appears in the above-identified patent and that said Letters Patent are hereby corrected as shown below:

Change claim 15 appearing in column 6 to read as follows:

--15. A system according to claim 1 wherein means (17) is coupled to said signaling means for checking whether a first fault has been cleared.--.

Signed and Sealed this eleventh Day of May 1976

[SEAL]

Attest:

RUTH C. MASON
*Attesting Officer*

C. MARSHALL DANN
*Commissioner of Patents and Trademarks*